(12) United States Patent
Nomura

(10) Patent No.: US 7,580,789 B2
(45) Date of Patent: Aug. 25, 2009

(54) NAVIGATION SYSTEM FOR VEHICLE

(75) Inventor: Toshio Nomura, Obu (JP)

(73) Assignee: DENSO CORPORATION, Kariya (JP)

( * ) Notice: Subject to any disclaimer, the term of this patent is extended or adjusted under 35 U.S.C. 154(b) by 492 days.

(21) Appl. No.: 11/384,331

(22) Filed: Mar. 21, 2006

(65) Prior Publication Data
US 2006/0217883 A1    Sep. 28, 2006

(30) Foreign Application Priority Data
Mar. 23, 2005  (JP) ............................. 2005-084687

(51) Int. Cl.
*G01C 21/26*  (2006.01)
(52) U.S. Cl. .................. 701/201; 701/211; 340/995.19; 340/995.24
(58) Field of Classification Search .................. None
See application file for complete search history.

(56) References Cited

U.S. PATENT DOCUMENTS

| | | | | |
|---|---|---|---|---|
| 6,427,118 B1 * | 7/2002 | Suzuki | ..................... | 701/209 |
| 6,434,482 B1 * | 8/2002 | Oshida et al. | ................. | 701/209 |
| 6,907,344 B2 * | 6/2005 | Nakagawa | .................. | 701/200 |
| 2005/0051623 A1 * | 3/2005 | Okuda et al. | ................. | 235/384 |
| 2005/0137788 A1 * | 6/2005 | Kimura | ..................... | 701/201 |

FOREIGN PATENT DOCUMENTS

| JP | 2001-317955 | * 11/2001 |
|---|---|---|
| JP | A-2002-323328 | 11/2002 |
| JP | A-2004-069561 | 3/2004 |

OTHER PUBLICATIONS

Journal of Denso Technical Disclosure, Apr. 15, 2005, pl. (English translation provided).

* cited by examiner

*Primary Examiner*—Michael J. Zanelli
(74) *Attorney, Agent, or Firm*—Posz Law Group, PLC

(57) ABSTRACT

A navigation system in a subject vehicle includes a display unit for displaying a map, a position detection function for detecting a current position and a traveling direction of the subject vehicle, a storage function for storing map data and facility data for displaying a facility icon on the map, a road recognition function for recognizing a road and a lane of the road where the subject vehicle is traveling, a facility selection function for searching a facility in the facility data and a facility icon control means for controlling the facility icon according to a facility type in the facility data. The facility icon on the map is selectively displayed on the map according to the traveling direction of the subject vehicle based on information calculated by above functions.

12 Claims, 5 Drawing Sheets

FIG. 6
PRIOR ART
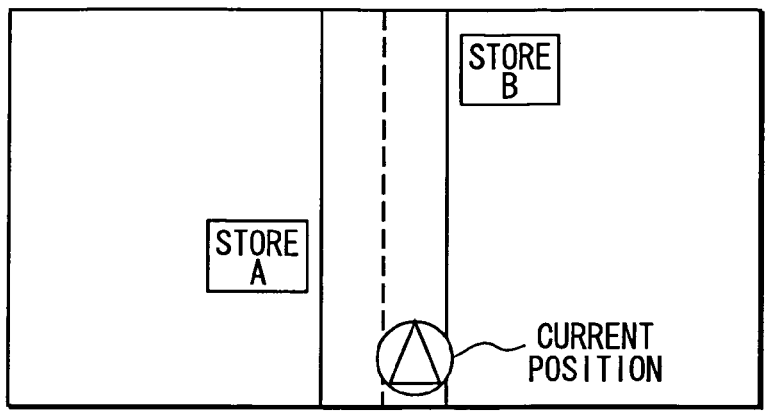
FIG. 7
| SELECTION ORDER | FACILITY TYPE | SELECTION FLAG |
|---|---|---|
| 1 | DRUG STORE | 1 |
| 2 | GAS STATION | 1 |
| 3 | RESTAURANT | 1 |
FIG. 8
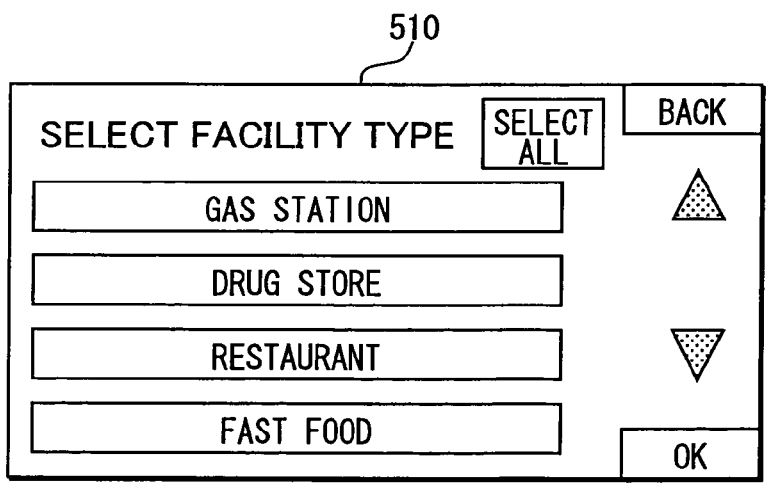
FIG. 9
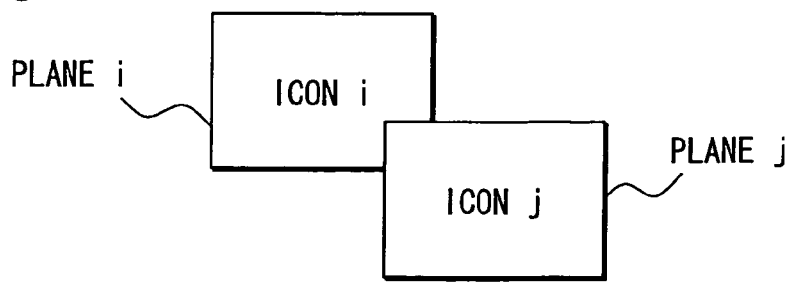

NAVIGATION SYSTEM FOR VEHICLE

CROSS REFERENCE TO RELATED APPLICATION

This application is based on and claims the benefit of priority of Japanese Patent Application No. 2005-84687 filed on Mar. 23, 2005, the disclosure of which is incorporated herein by reference.

FIELD OF THE INVENTION

The present invention generally relates to a navigation system.

BACKGROUND OF THE INVENTION

Conventionally, a navigation system is used to display icons of roadside facilities such as a drug store, a gas station, a restaurant or the like on a road map. Display of the icons of the road-side facilities is configurable based on user input from a display configuration menu. Upon receiving the user input for turning on, for example, the icons of the drug store, the navigation system displays drug store icons around a current position of a subject vehicle on the map. In this manner, a user of the navigation system can locate the drug stores around the current position of the subject vehicle on the road map. However, the user has to display the display configuration menu again to turn off the drug store icons on the road map.

The conventional navigation system displays, for example, the drug store icons on the road map as shown in FIG. 6 when the user specifies the drug store for display in order to locate a nearest one as a destination of a travel or the like. In this case, a drug store B is more accessible than a drug store A because the store B faces a lane where the subject vehicle is traveling. In other words, the subject vehicle has to cross traffic in an opposite lane before entering into the store A. However, the user may choose to enter into the store A only because the store A is closer to the current position of the subject vehicle than the store B.

Furthermore, the conventional navigation system maintains display of, for example, bookstore icons even after the user of the navigation system successfully achieved his/her purpose for dropping in at a bookstore. However, the user has to open the display configuration menu for turning off the bookstore icons on the road map. The bookstore icons kept on the road map may obstacle other icons when the user avoids cumbersome procedure of turning off the bookstore icons in the display configuration menu.

Furthermore, the conventional navigation system may assign, for example, both full-serve restaurant icons and fast-food restaurant icons to one restaurant as representation on the road map when the restaurant has attributes that can be categorized as both of the full-serve restaurant and the fast-food restaurant. In this case, a restaurant D categorized as both of the full-serve/fast-food restaurant may be mistakenly recognized as the fast-food restaurant on the road map when the fast-food restaurant icon for the restaurant D is displayed on top of the full-serve restaurant icon for the same facility.

The problems described above may be caused by displaying all the icons of the specified facility type(s) on the road map, and those icons may merely obstruct other facility icons, location names or the like on the road map.

SUMMARY OF THE INVENTION

In view of the above-described and other problems, the present invention provides a navigation system that displays icons of roadside facilities on a road map according to accessibility of a user of the navigation system.

The present invention also provides the navigation system that displays only required icons of the roadside facilities on the map without receiving input from the user.

The present invention also provides the navigation system that displays a plurality of icons in an alternating manner when those icons overlap each other on the map.

The navigation system of the present invention for use in a subject vehicle for organizing a navigation instruction of a navigation route toward a destination in map data includes a display unit for displaying a map based on the map data, a position detection function for detecting at least one of a current position and a traveling direction of the subject vehicle, a storage function for storing the map data and facility data for representation of a facility in the map, a road recognition function for recognizing a road and a lane of the road where the subject vehicle is traveling, a facility selection function for performing facility selection in the facility data and a representation control function for controlling representation of the facility according to the facility type. The facility data in the system includes facility location and facility type. The facility selection function includes the facility data located along the lane of the road in the traveling direction of the subject vehicle in the facility selection and excludes the facility data located along an opposite lane in terms of the traveling direction of the subject vehicle from the facility selection. The representation control function controls the representation of the facility located in the map on the display unit based on the facility type in the facility data selected by the facility selection function.

The navigation system selectes facility data that represent accessible facilities located on the road map. That is, for example, the navigation system displays the icons of the roadside facilities that are located along a portion of a road where the subject vehicle is expected to travel based on a traveling direction of the subject vehicle. In other words, the roadside facilities on an opposite lane are precluded from facility selection in the map data. In this manner, only the roadside facilities being accessible by the user are displayed on the road map as icons.

In another aspect of the present invention, the navigation system chooses facility data of the roadside facilities located on the road in the traveling direction of the subject vehicle. In this manner, only the icons of the roadside facilities along the road in the traveling direction are displayed on the map.

In yet another aspect of the present invention, the navigation system chooses facility data that is located on a side of a traveling lane of the subject vehicle in the navigation route toward a destination based on the calculation of the navigation route by the navigation system for display on the road map. In this manner, the accessible roadside facilities along the navigation route are selecteded and displayed on the road map.

In still yet another aspect of the present invention, the navigation system chooses the roadside facilities based on a current position of the subject vehicle. In this manner, the accessible roadside facilities along the navigation route are selected and displayed on the road map.

In still yet another aspect of the present invention, the navigation system accepts an user input for performing exclusion of facility data from the facility selection. In this manner, the user can determine the exclusion of certain facility data from the facility selection for display on the road map.

In still yet another aspect of the present invention, the navigation system includes a display unit for displaying a map based on the map data, a storage function for storing the map data and facility data having facility location/type for representation of a facility in the map, a facility display function for determining the facility type excluded from representation in the map based on a condition of the subject vehicle, a facility selection function for performing facility selection in the facility data that does not include the facility type determined by the facility display function, and a representation control function for controlling representation of the facility according to the facility type. The navigation system uses these functions for precluding certain facility data from the facility selection for displaying the facilities on the road map based on a condition of the subject vehicle. In this manner, the icons of the facilities displayed on the road map automatically reflect the condition of the subject vehicle, thereby saving a cumbersome procedure by the user for turning off unnecessary icons from the road map.

In still yet another aspect of the present invention, the navigation system includes a position detection function, an arrival detection function and a time keeping function for turning off icons of a certain type when the subject vehicle stays at the facility for longer than a predetermined time. For example, drug store icons are turned off from the road map after the user drops off at a drug store because possibility of dropping off at another drug store is decreased by the drop-off.

In still yet another aspect of the present invention, the navigation system turns on the icons that are previously turned off from the road map after a certain amount of time. For example, the drug store icons may be turned on on February 12th after having been turned off on February 10th because the user may want to drop off at the drug store on every other day. In this manner, the navigation system saves the user from going through a cumbersome procedure for turning on the facility icons on the road map.

In still yet another aspect of the present invention, the navigation system allows the user to set the predetermined period between turning on the facility icons after turning off. In this manner, the period between the turning on and turning off can arbitrarily be determined.

In still yet another aspect of the present invention, the navigation system turns off the icons of gas stations when detected fuel level of the subject vehicle is greater than a predetermined level. In this manner, the navigation system saves the user from going through a cumbersome procedure for turning off gas station icons from the road map.

In still yet another aspect of the present invention, the navigation system allows the user to determine exclusion of a certain facility type according to user input. In this manner, the user can determine the exclusion of the certain facility type from displaying on the road map.

In still yet another aspect of the present invention, the navigation system includes a display unit for displaying a map based on the map data, a storage function for storing the map data and facility data having the facility location/type for representation of a facility in the map, a facility selection function for choosing the facility data to be represented in the map, and a representation control function for controlling representation of the facility according to the facility type. In this case, a plurality of facility representations in the map controlled by the representation control function alternate at a predetermined interval when the facility representations overlap each other because of the facility location defined in the map data.

The facility icons that overlap each other can clearly be recognized when the representation control function alternates the overlapping icons. In this manner, the facility icons flocking in a small area or the facility that belongs to more than one facility types can be represented in a more "viewable" manner on the road map.

In still yet another aspect of the present invention, the navigation system alternates same facility icons at different locations on the road map in synchronization at the predetermined interval. In this manner, the user can locate the facilities of a certain type at different locations in the road map.

In still yet another aspect of the present invention, the navigation system allows the user to set the predetermined interval of alternation between the icons. In this manner, the user can set an arbitrary interval for alternation of the icons on the road map.

In still yet another aspect of the present invention, the navigation system changes a contrast of the display unit in synchronization with the alternation of the icons according to a control by the representation control function. In this manner, the user can clearly recognize the alternation of the icons displayed on the road map.

In still yet another aspect of the present invention, the navigation system changes background colors of the road map in synchronization with the alternation of the icons by using different background color data stored in the storage function. In this manner, the user can clearly recognize the alternation of the icons displayed on the road map.

In still yet another aspect of the present invention, the navigation system changes text colors of the road map in synchronization with the alternation of the icons by using different text color data stored in the storage function. In this manner, the user can clearly recognize the alternation of the icons displayed on the road map.

In still yet another aspect of the present invention, the navigation system allows the user to determine execution of the alternation according to user input. In this manner, the user can determine alternating display of facility icons.

BRIEF DESCRIPTION OF THE DRAWINGS

Other objects, features and advantages of the present invention will become more apparent from the following detailed description made with reference to the accompanying drawings, in which:

FIG. 6 shows an illustration of a situation displayed in a conventional navigation system;

FIG. 7 shows a data table stored in a storage function in the present embodiment;

FIG. 8 shows an example of a facility icon menu in the present embodiment; and

FIG. 9 shows an illustration of two icons overlapping each other.

DETAILED DESCRIPTION OF THE PREFERRED EMBODIMENTS

Embodiments of the present invention are described with reference to the drawings. A navigation system 100 of the present invention is intended for use in a subject vehicle such as an automobile or the like.

Figure 1:
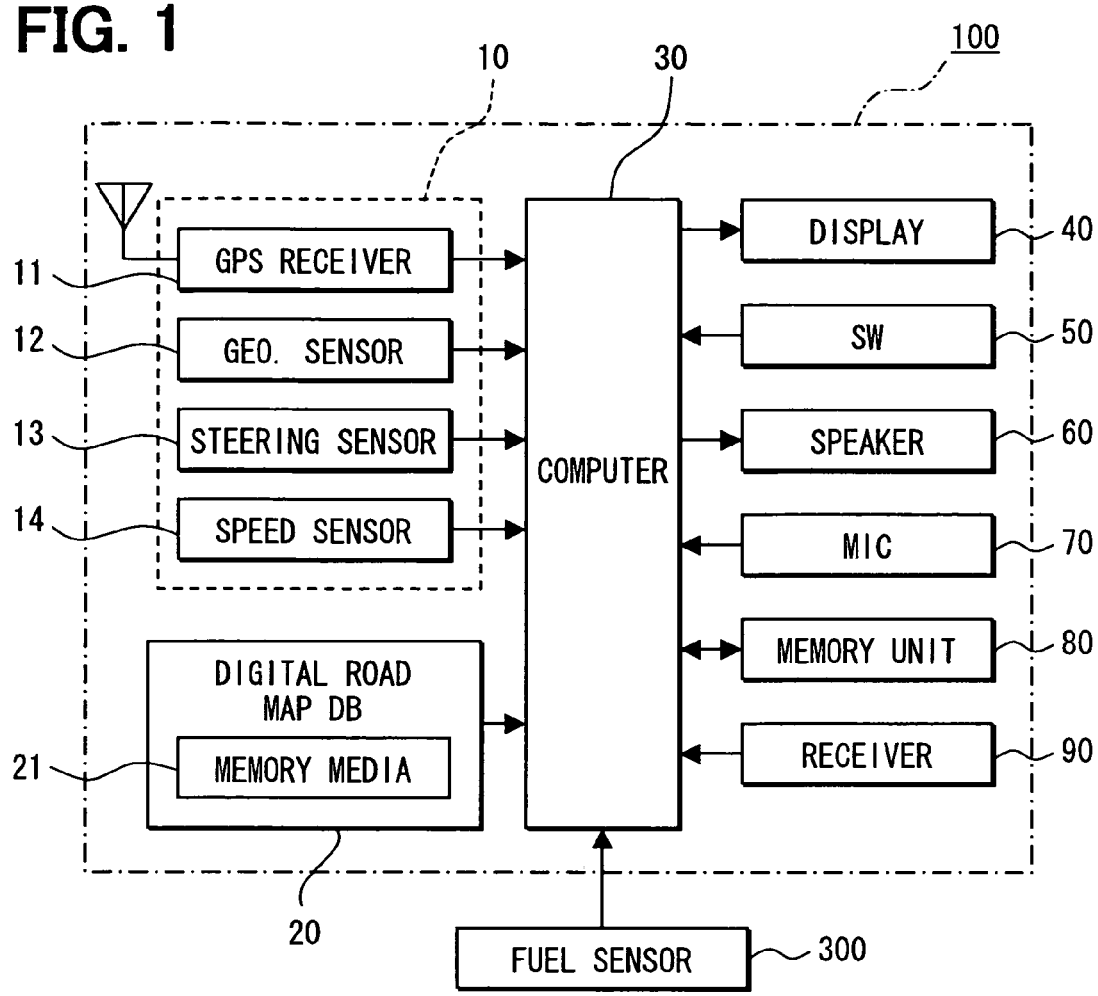
FIG. 1 shows a block diagram of a navigation system for use in a subject vehicle in an embodiment of the present invention.

FIG. 1 shows a block diagram of the navigation system 100 in an embodiment of the present invention. The navigation system 100 includes a position detector 10, a digital road map database 12, a computer 30, a display unit 40, operation switches 50, a speaker 60, a microphone 70, a memory unit 80, and a traffic information receiver 90.

The computer 30 has a CPU, a ROM, a RAM, an I/O of well-known type included therein and a bus line for connecting these component. The ROM stores a program that is executed in the computer 30, and the CPU or the like performs a predetermined calculation process according to the program stored in the ROM. In addition, the computer 30 is connected to a fuel sensor 300 that detects a fuel level of the subject vehicle.

The position detector 10 includes a plurality of sensors such as a Global Positioning System (GPS) receiver 11, a geomagnetism sensor 12, a steering sensor 13, and a speed sensor 14. These sensors are used to detect positions and speed of the subject vehicle based on a relative traveling angle, a traveling speed of the subject vehicle or the like.

The position detector 10 utilizes information on a current position and a traveling direction of the subject vehicle from those sensors 11, 12, 13, 14 for radio navigation and/or autonomous navigation. The other information from, for example, an optical beacon, a wheel sensor or the may also be utilized for calculation and navigation.

The digital road map database 20 includes link data, node data, facility data, background data, text data and the like. The data in the database 20 is utilized in the computer 30. The database 20 also includes a memory medium 21, and the memory medium 21 usually is a CD-ROM type medium or a DVD-ROM type medium. The memory medium 21 may be a memory card, a hard disk or the like.

Map data stored in the database 20 includes road data that is defined by using a node and a link between two nodes based on the link data and the node data, and the link and the node are defined by their specific numbers (IDs), positions (longitude/latitude), types, connection relationships to each other and the like. The link data may also include road attributes such as a road name, a road type, a road width, a number of lanes, a speed limit or the like. The node data may also include an intersection type or the like.

The map data also includes facility data. The facility data includes facility attributes such as a facility name, a facility position (longitude/latitude), a facility type, a facility size, and the like for each of the facilities. The facility data defines one-to-one correspondence of a facility type and an icon for representing the facility type on a road map.

The background data is used to display a background of the road map on the display unit 40, such as facility appearances, geographical features or the like. The background of the road map is described by using surface data for facilities, mountains, rivers, lakes or the like, and line data for administration boundaries (counties or the like). The surface data and the line data include multiple color attributes, such as black, blue, yellow, pink and in other hues.

The text data includes position attributes (e.g., coordinates) for displaying text of location names, facility names, road names or the like on the road map. The text data also includes color attributes for defining a color of each character of the text. The color attributes of the text may include definitions of black, blue, yellow, pink or in other hues.

The display unit 40 includes, for example, a liquid crystal display for displaying the current position of the subject vehicle and the road map around the current position of the vehicle. The icons for certain facility type are also displayed on the road map when the facility type is configured for display on the road map. The display unit 40 has a capability of controlling a contrast according to a contrast signal from the computer 30.

The operation switches 50 are disposed, for example, on or around the display unit 40 for accepting various inputs from a user of the navigation system 100. The operation switches 50 are touch switches or mechanical switches.

The speaker 60 outputs guidance voice of navigation instructions and/or guidance voice for voice recognition. The microphone 70 is used to input user's voice into the computer 30. The computer processes inputted voice for controlling various processes.

The memory unit 80 stores the facility types to be displayed on the road map, selection order of the facility types, and selection flag for selecting the facility types for display on the road map. The selection flag is set to "1" when the facility type is selected for the display, and is set to "0" when the facility type is not selected for the display. In addition, the selection flag is also set to "0" when the facility type is determined to be a non-display type by a display determination process described later.

The traffic information receiver 90 receives traffic information distributed from road side beacons, FM stations, or other type of communication. The receiver 90 may also be used for transmitting information from the subject vehicle to road side facilities or the like. The traffic information received by the receiver is utilized in the computer 30 for displaying, for example, traffic congestion information, speed limit information or the like on the road map in the display unit 40.

The navigation system 100 in the present embodiment provides a route navigation function for navigating the subject vehicle toward a destination through an optimum route from the operation switches 50 or the like. The optimum route toward the destination is calculated by using Dijkstra method or the like. The destination may be searched and specified based on an address, a facility name, a telephone number, or the like inputted by the user.

The computer 30 controls above-described functions by using various calculation processes or the like. That is, the computer 30 calculates the optimum route toward the destination upon receiving an input of the destination based on the map data stored in the database 20. The optimum route is displayed with the current position of the subject vehicle, on the road map appropriately scaled for navigation in the display unit 40.

The fuel sensor 300 is disposed in a fuel tank for converting fuel level into a resistance value.

Display of icons on the road map for representing facilities are controlled in a manner described in the following with reference to flowcharts in FIGS. 2 to 5.

Figure 3:
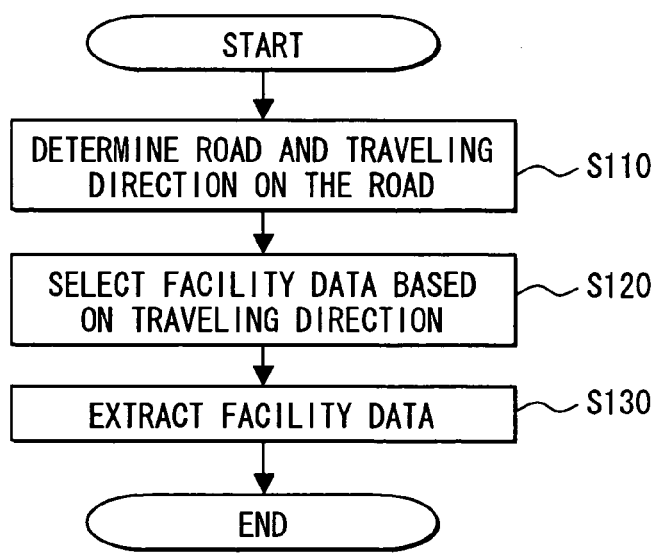
FIG. 3 shows a flowchart of a facility selection process in the embodiment.
Figure 2:
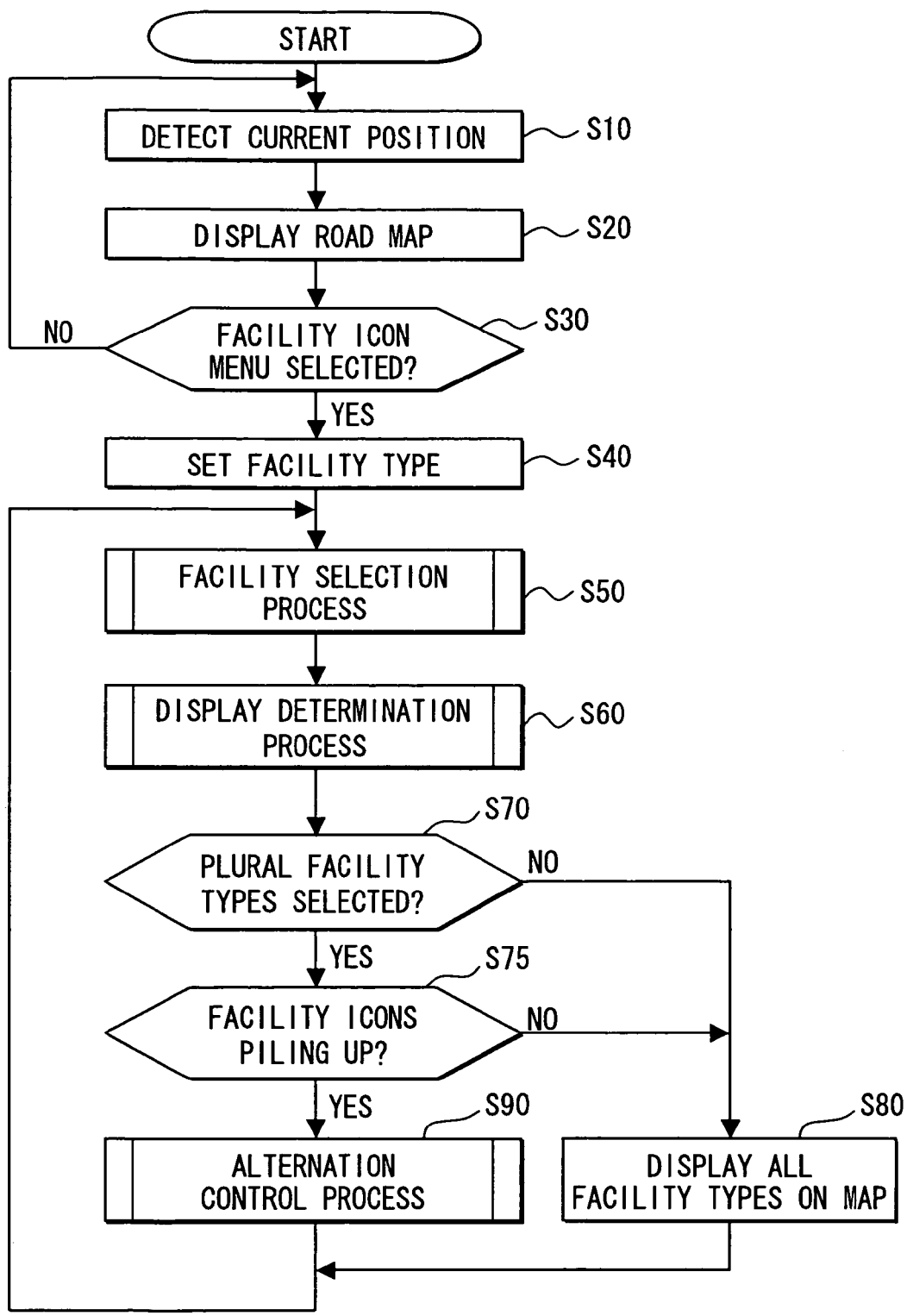
FIG. 2 shows a flowchart of a facility icon control process in the embodiment.
Figure 4:
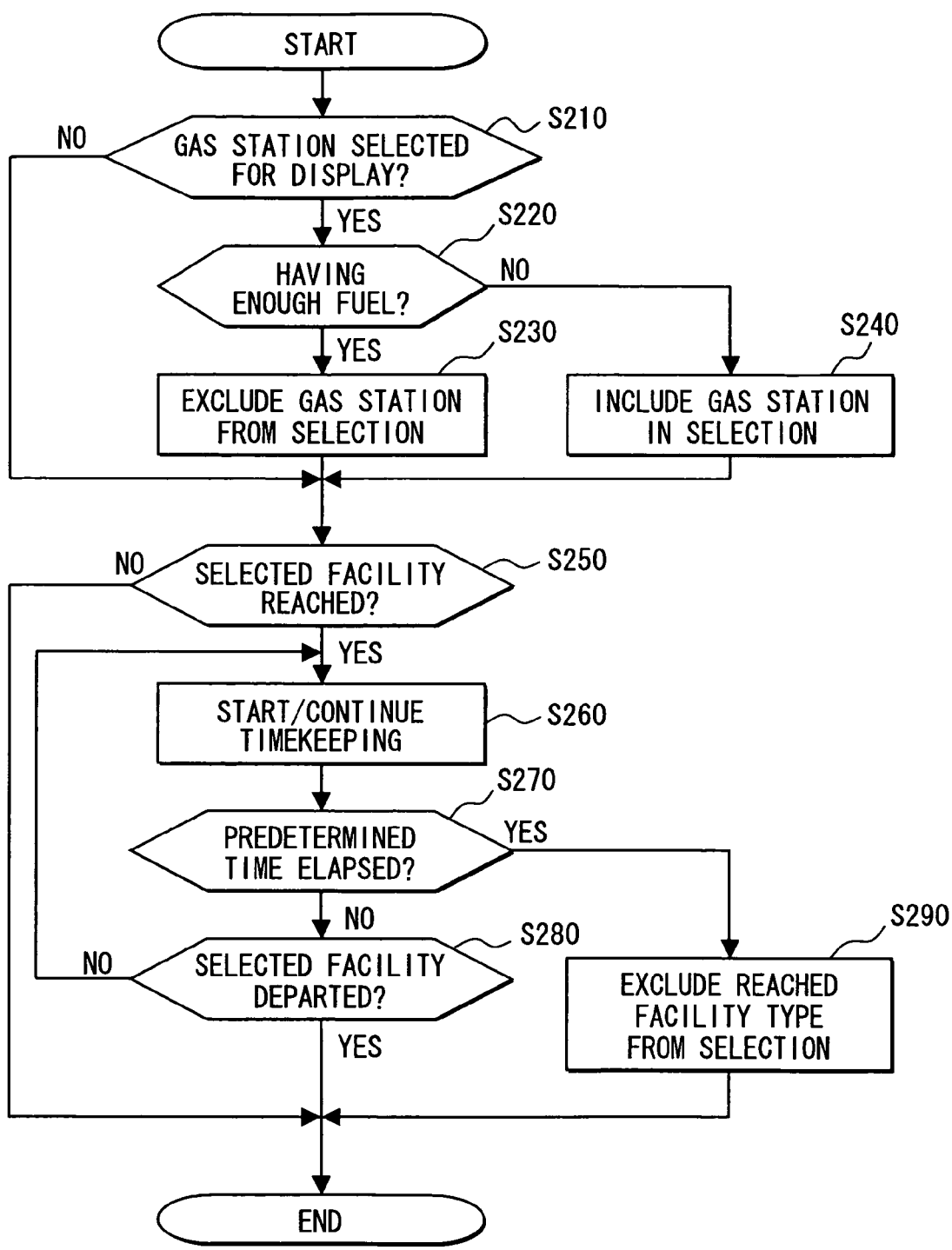
FIG. 4 shows a flowchart of a display determination process in the embodiment.
Figure 5:
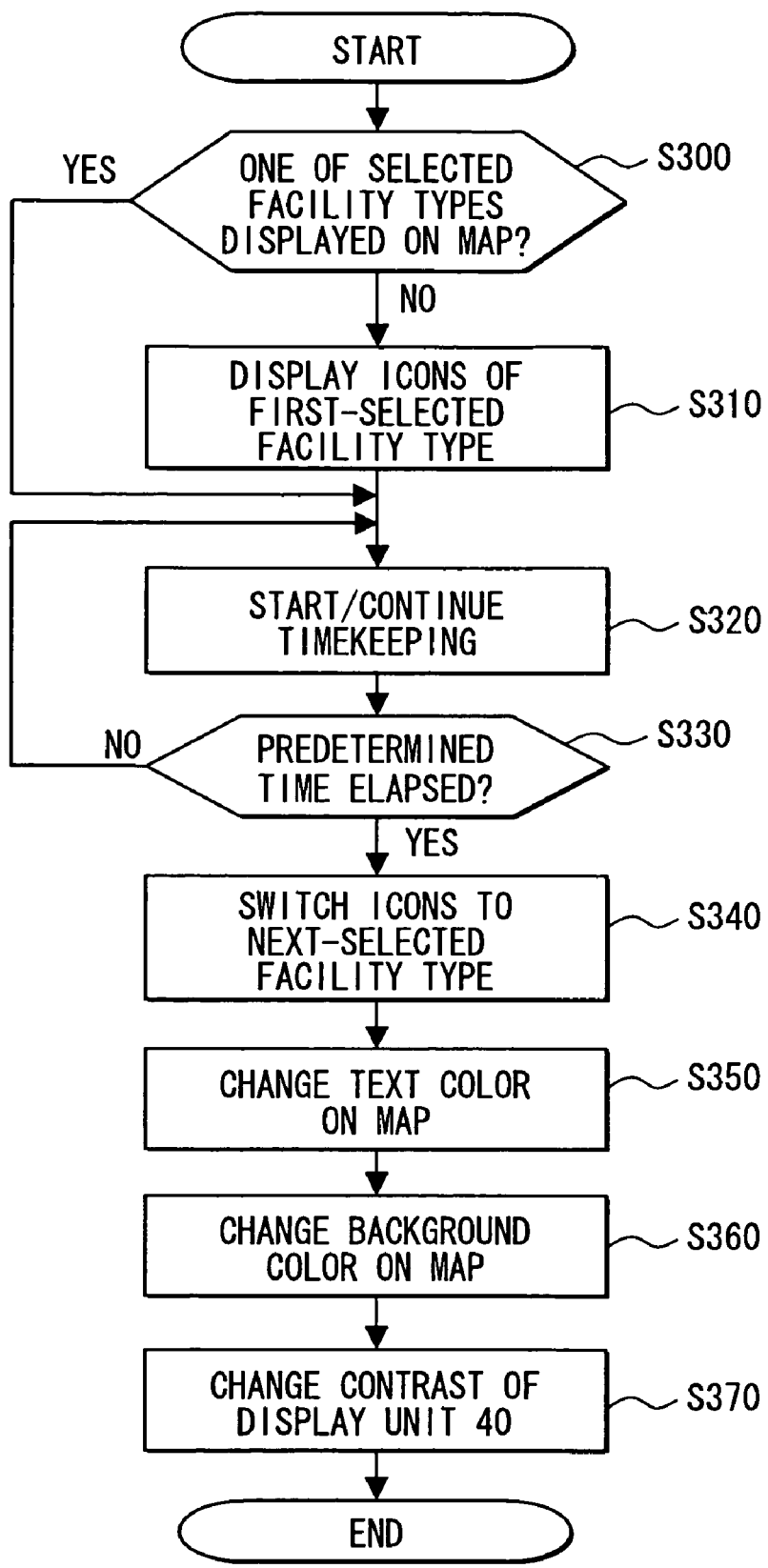
FIG. 5 shows a flowchart of an alternation control process in the embodiment.

FIG. 2 shows a flowchart of a facility icon control process in the present embodiment, and FIG. 3 shows a flowchart of a facility selection process in the present embodiment. Further, FIG. 4 shows a flowchart of the display determination process in the present embodiment, and FIG. 5 shows a flowchart of an alternation control process in the present embodiment.

In step S10 of the facility icon control process (main routine), the current position of the subject vehicle is detected. The current position of the subject vehicle is basically calculated based on the autonomous navigation with the assistance of the radio navigation by the GPS receiver 11 and other sensors 12, 13, 14. The current position of the subject vehicle is incrementally calculated by using previous positions and traveling directions.

In step S20, the process retrieves road map data around the current position from the database 20 for displaying the road map on the display unit 40.

In step S30, the process determines whether the facility is displayed as the icon. That is, for example, when the process displays a basic display configuration menu on the display unit 40, the process determines whether a "Facility icon menu" item in the basic display configuration menu is selected.

In step S40, the process displays a facility icon menu 510 as shown in FIG. 8 for controlling facility icon display on the road map. The facility icon menu 510 includes selectable items such as "Gas station," "Drug store," "Restaurant," or the like for setting facility types to be displayed on the road map. When the user selects one or more items and presses OK button in the menu 510, the facility type to be displayed on the map is determined. The memory unit 80 stores the selected facility type(s) with an order of selection of each selected type. The selection flag in the facility data is set to "1" when the facility type is selected. For example, when the facility type "Gas station," "Drug store," and "Restaurant" are selected in this order, the memory unit 80 stores selection order and the facility type in one-to-one correspondence with the selection flag of "1" as shown in a data table in FIG. 7.

Further, the user may use "Select all" button in the icon menu 510 for selecting all the items to be displayed on the road map. In this case, selection order of the facility types is presumed to be top to bottom order in the menu 510. That is, the order of the facility types in the data table looks like "Gas station," "Drug store," "Restaurant," and "Fast food."

In step S50, the process executes a facility selection process (a sub-routine). The facility selection process is used to select accessible facilities based on the traveling direction of the subject vehicle. The facility selection process is described with reference to a flowchart in FIG. 3.

In step S110, the facility selection process determines a road and a lane (a traveling direction) in the road where the subject vehicle is traveling. That is, for example, the process determines the road and the traveling direction based on a trace of the subject vehicle over a certain period derived from the position detector 10. The trace of the subject vehicle is compared with the road map in the database 20 for determination of the traveling direction.

In step S120, the facility selection process filters facility data based on the traveling direction of the subject vehicle. That is, for example, the facility data located along a roadside of the lane where the subject vehicle is traveling, and the facility data along a portion of the road (navigation route) in the traveling direction toward the destination is included in a facility selection. In other words, the facility data located along the roadside of an opposite lane relative to the traveling direction of the subject vehicle is excluded from the facility selection.

In step S130, the facility type to be displayed on the road map (facility data having selection flag "1") is extracted from the facility data based on the facility selection in step S120. That is, the facility data located in the portion of the navigation route between the current position and the destination and located on the side of the lane where the subject vehicle is traveling is extracted for the display on the road map.

In addition, the facility data in the database 20 that is not located along the navigation route may be included in the facility selection.

The facility selection process filters the facility data for selectively displaying accessible facilities along the navigation route. In other words, the facility selection process allows the navigation system 100 to display required facilities only in terms of user needs on the road map. In this manner, visibility of the facility icons on the road map is improved.

The process returns to the flowchart in FIG. 2.

In step S60, the process executes a display determination process (a sub-routine) shown in a flowchart in FIG. 4. The display determination process determines whether an icon for a certain facility type is set to be displayed on the road map.

In step S210, the display determination process determines whether "Gas station" is selected to be displayed on the road map. That is, the process determines whether "Gas station" is stored in the memory unit 80. When "Gas station" is stored in the memory unit 80, the process proceeds to step S220.

In step S220, the display determination process determines whether gas station icons are turned off on the road map based on the fuel level of the subject vehicle. That is, when the resistance value derived from the fuel sensor 300 is greater than a predetermined value, the fuel level is determined above a certain level. When the fuel level is greater than the predetermined level, the process proceeds to step S230. The process proceeds to step S240 when the fuel level is not greater than the predetermined level.

In step S230, the display determination process sets the selection flag of the facility type "Gas station" in the data table in the memory unit 80 to be a value of "0." In this manner, the facility data for gas station is not selected for the display on the road map. In other words, while the user needs for locating the gas station is relatively low, the gas station icon on the road map is turned off.

In step S240, the display determination process sets the selection flag of the facility type "Gas station" in the data table in the memory unit 80 to be a value of "1." In this manner, the the facility data for gas station is selected for the display on the road map.

In step S250, the display determination process determines the facility type to be turned off on the road map based on the facility that is reached by the subject vehicle. That is, the facility position in the facility data is compared with the current position of the subject vehicle. The process proceeds to step S260 when the difference between the facility position and the current position is smaller than a predetermined value.

In step S260, the computer 30 counts or continues counting of elapsed period of stay of the subject vehicle in the facility.

In step S270, the period of stay is compared with a predetermined time (e.g., 5 minutes). The process proceeds to step S280 when the period of stay is less than the predetermined time. The process proceed to step S290 when the period of stay reaches the predetermined time.

In step S280, the display determination process determines whether the subject vehicle departed the facility. That is, the current position of the subject vehicle is compared with the facility position. The process returns to step S260 when the difference between the current position and the facility position is not greater than a predetermined value. The process concludes when the difference is greater than the predetermined value.

In step S290, the selection flag in the data table in the memory unit 80 is set to "0" in order to turn off the icons of a certain facility type that is no longer required on the road map. For example, the icons of the drug store is turned off on the road map after the user drops off at a drug store. The drug store icons are turned off because dropping off at the drug store substantially decreased user needs to locate a drug store on the road map.

The display determination process filters the facility data for selectively displaying facilities of user's request based on a condition of the subject vehicle. In other words, the facilities of the user's request may be turned off once the user needs is fulfilled by dropping off at one of the facilities of the user's request. In this manner, visibility of the facility icons on the road map is improved.

The process returns to the flowchart in FIG. 2.

In step S70, the process determines whether a plurality of facility types are selected for the display on the road map in the facility selection process in step S50. The process proceeds to step S75 when the plurality of the facility types are selected. The process proceeds to step S80 when the plurality of the facility types are not selected.

In step S75, the process determines whether two or more facility icons overlap each other in the road map. That is, a rectangular area of a facility icon is defined based on the facility position in the facility data, and coordinates of four corners of the facility icon are calculated for determination of overlapping. Then, overlapping of two icons is mathematically determined by evaluating overlapping of two rectangular planes i and j defined by coordinates of four corners. An illustration of the two icons in FIG. 9 explains the situation. The process proceeds to step S80 when the two icons are determined not to be overlapping, and all icons of selected facility types are displayed on the road map. The process proceeds to step S90 when the two icons are determined to be overlapping.

In step S80, the selected facility type is respectively displayed on the road map. For example, the facility type of "Drug store" is displayed on the road map by using the drug store icons retrieved from the memory medium 21 by the computer 30. The drug store icons are arranged by using the facility position in the facility data on the road map.

In step S90, the process executes an alternation control process (a sub-routine) for visibly displaying the facility icons of different types located in a small area. The alternation control process is described with reference to a flowchart in FIG. 5. In this case, the alternation control process is applied for icons of selected facility types by the facility selection process in step S50, i.e., "Drug store" and "Restaurant," after facility types "Gas station," "Drug store," and "Restaurant" are selected for the display on the road map. The process returns to step S50 when the alternation control process in step S90 is concluded.

The alternation control process turns off all icons on the road map before starting the alternation control process in case that all icons of the selected facility types are turned on in step S80 beforehand.

In step S300, the alternation control process determines whether one of the selected facility type is already displayed as the facility icons on the road map. The process proceeds to step S310 when no facility icon of the selected facility type is determined to be displayed on the map. The process proceeds to step S320 when one of the selected facility types is determined to be displayed on the map.

In step S310, the alternation control process displays the facility icon that is selected first in the display configuration menu. In this case, the drug store icons being selected first in the configuration menu is displayed on the road map.

In step S320, the alternation control process executed by the computer 30 starts or continues counting of elapsed time after displaying the facility icon.

In step S330, the alternation control process determines whether the elapsed time reaches a predetermined time, e.g., two minutes. The process proceeds to step S340 when the predetermined time is determined to be reached. The alternation control process concludes when without going through S340 and S370 the predetermined time is determined not to be reached.

In step S340, the alternation control process switches the facility icons on the road map. That is, in this case, the drug store icons are switched to the restaurant icons according to the order of selection in the configuration menu. In this manner, the user of the navigation system 100 can recognize locations of a certain facility type.

In step S350, the alternation control process changes text colors on the road map. For example, the text color on the road map in the display unit 40 is changed from black to blue according to the text data retrieved from the database 20. In this manner, the user can recognize that the facility icons are switched on the road map.

In step S360, the alternation control process changes background colors on the road map. For example, the background color of a lake on the road map in the display unit 40 is changed from blue to pink according to the background data (surface data) retrieved from the database 20. In this manner, the user can recognize that the facility icon are switched on the road map.

In step S370, the alternation control process changes a contrast of the display unit 40. That is, for example, the computer 30 outputs a contrast signal to the display unit 40, and the contrast of the display unit 40 is changed according to the contrast signal. In this manner, the user can recognize that the facility icons are switched on the road map.

The alternation control process controls alternating display of facility icons of different facility types. The alternating display of the icons of different facility types improves ease of recognition of the facility icons when various types of facility icons are displayed on the road map. Further, the facility icons overlapping each other can clearly recognized when display of each of the icons are alternated.

Although the present invention has been fully described in connection with the preferred embodiment thereof with reference to the accompanying drawings, it is to be noted that various changes and modifications will become apparent to those skilled in the art.

For example, the navigation system 100 may allow the user to determine whether the facility selection process is executed. In this case, all the facility icons along the traveling road are selected regardless of the lanes (including the opposite lane) of the road when the facility selection process is not executed. In addition, the facility icons only on the traveling lane side along the navigation route may be selected from the facility data. Further, the facility icons only in a portion of the navigation route between the current position of the subject vehicle and the destination may be selected.

Further, the navigation system 100 may allow the user to determine whether the display determination process is executed. In this case, for example, the drug store icons are kept on the road map even after the subject vehicle is determined to have reached one of the drug stores. In addition, the facility type once turned off from the road map may be turned on after a certain period. Further, the period before turning-on the facility icons of reached facility type (once turned-off facility icons) may be determined according to the user input.

Furthermore, the navigation system 100 may allow the user to determine whether the alternation control process is executed. In this case, all the selected facility icons are displayed on the road map. In addition, the interval of the alternation may be determined according to the user input.

Such changes and modifications are to be understood as being within the scope of the present invention as defined by the appended claims.

What is claimed is:

1. A navigation system for use in a subject vehicle for organizing a navigation route in map data comprising:
    a display unit for displaying a map based on the map data;
    a storage means for storing the map data and facility data for representation of a facility in the map, wherein the facility data includes a facility location and a facility type;
    a facility display means for determining the facility type excluded from representation in the map based on a condition of the subject vehicle;
    a facility selection means for performing facility selection in the facility data that excludes the facility type determined by the facility display means; and
    a representation control means for controlling representation of the facility according to the facility type,
    wherein the representation control means controls the representation of the facility positioned in the map on the display unit based on the facility location in the facility data selected by the facility selection means.

2. The navigation system according to claim 1 further comprising:
    a position detection means for detecting a current position of the subject vehicle;
    an arrival detection means in the facility display means for detecting an arrival of the subject vehicle to the facility based on the current position of the subject vehicle;
    a timekeeping means in the facility display means for keeping a period of stay of the subject vehicle at the facility upon detecting the arrival of the subject vehicle to the facility by the arrival detection means;
    wherein the facility type of the facility detected by the arrival detection means is excluded from the representation of the facility in the map when the period of stay amounts to a predetermined time.

3. The navigation system according to claim 2 further comprising:
    a period-keeping means for keeping a period of exclusion of the facility type from the representation of the facility in the map based on determination by the facility display means,
    wherein the exclusion of the facility type from the representation is cancelled when the period of exclusion of the facility type from the representation of the facility in the map amounts to a predetermined time.

4. The navigation system according to claim 3,
    wherein the predetermined time is set according to user input.

5. The navigation system according to claim 1 further comprising,
    a fuel level detection means in the facility display means for detecting a fuel level,
    wherein the facility display means excludes fueling type facility from the representation of the facility when the fuel level detected by the fuel level detection means is greater than a predetermined amount.

6. The navigation system according to claim 1,
    wherein exclusion of the facility type by the facility display means is set according to user input.

7. A navigation system for use in a subject vehicle for organizing a navigation route in map data comprising:
    a display unit for displaying a map based on the map data;
    a storage means for storing the map data and facility data for representation of a facility in the map, wherein the facility data includes a facility location and a facility type;
    a facility selection means for choosing the facility data to be represented in the map; and
    a representation control means for controlling representation of the facility according to the facility type,
    wherein a plurality of facility representations in the map controlled by the representation control means alternate at a predetermined interval when the facility representations overlap each other because of the facility location defined in the facility data; and
    wherein the facility representations of a same type at different locations are alternated in synchronization at the predetermined interval by the representation control means.

8. A navigation system for use in a subject vehicle for organizing a navigation route in map data comprising:
    a display unit for displaying a map based on the map data;
    a storage means for storing the map data and facility data for representation of a facility in the map, wherein the facility data includes a facility location and a facility type;
    a facility selection means for choosing the facility data to be represented in the map; and
    a representation control means for controlling representation of the facility according to the facility type,
    wherein a plurality of facility representations in the map controlled by the representation control means alternate at a predetermined interval when the facility representations overlap each other because of the facility location defined in the facility data; and
    wherein the predetermined interval of the alternation is set according to user input.

9. A navigation system for use in a subject vehicle for organizing a navigation route in map data comprising:
    a display unit for displaying a map based on the map data;
    a storage means for storing the map data and facility data for representation of a facility in the map, wherein the facility data includes a facility location and a facility type;
    a facility selection means for choosing the facility data to be represented in the map; and
    a representation control means for controlling representation of the facility according to the facility type,
    wherein a plurality of facility representations in the map controlled by the representation control means alternate at a predetermined interval when the facility representations overlap each other because of the facility location defined in the facility data; and
    wherein a contrast of the display unit is variably controlled, and
    the representation control means controls the contrast of the display unit when the facility representations are alternated.

10. A navigation system for use in a subject vehicle for organizing a navigation route in map data comprising:
    a display unit for displaying a map based on the map data;
    a storage means for storing the map data and facility data for representation of a facility in the map, wherein the facility data includes a facility location and a facility type;

a facility selection means for choosing the facility data to be represented in the map; and a representation control means for controlling representation of the facility according to the facility type, wherein a plurality of facility representations in the map controlled by the representation control means alternate at a predetermined interval when the facility representations overlap each other because of the facility location defined in the facility data; and wherein the storage means stores plural types of background color data for displaying different background colors in the map, and the representation control means changes background colors in the map in accordance with alternation of the facility representations at the predetermined interval.

11. A navigation system for use in a subject vehicle for organizing a navigation route in map data comprising:

a display unit for displaying a map based on the map data;

a storage means for storing the map data and facility data for representation of a facility in the map, wherein the facility data includes a facility location and a facility type;

a facility selection means for choosing the facility data to be represented in the map; and a representation control means for controlling representation of the facility according to the facility type, wherein a plurality of facility representations in the map controlled by the representation control means alternate at a predetermined interval when the facility representations overlap each other because of the facility location defined in the facility data; and wherein the storage means stores plural types of text color data for displaying different text colors in the map, and the representation control means changes text colors in the map in accordance with alternation of the facility representations at the predetermined interval.

12. A navigation system for use in a subject vehicle for organizing a navigation route in map data comprising:

a display unit for displaying a map based on the map data;

a storage means for storing the map data and facility data for representation of a facility in the map, wherein the facility data includes a facility location and a facility type;

a facility selection means for choosing the facility data to be represented in the map; and a representation control means for controlling representation of the facility according to the facility type, wherein a plurality of facility representations in the map controlled by the representation control means alternate at a predetermined interval when the facility representations overlap each other because of the facility location defined in the facility data; and wherein the alternation of the facility representations by the representation control means is set according to user input.

* * * * *